United States Patent
Amer et al.

(10) Patent No.: US 11,821,643 B2
(45) Date of Patent: *Nov. 21, 2023

(54) SMART CONTROL MODULE FOR DUCTLESS HVAC UNITS

(71) Applicant: Cielo WiGle Inc., Redmond, WA (US)

(72) Inventors: Waseem Amer, Islamabad (PK); Anees Ahmed Jarral, Islamabad (PK); Aftab Farooji, Redmond, WA (US)

(73) Assignee: Cielo WiGle Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,629

(22) Filed: Oct. 27, 2021

(65) Prior Publication Data

US 2023/0132079 A1    Apr. 27, 2023

Related U.S. Application Data

(63) Continuation of application No. 17/512,622, filed on Oct. 27, 2021.

(51) Int. Cl.
*F24F 11/63*    (2018.01)
*F24F 11/56*    (2018.01)
(Continued)

(52) U.S. Cl.
CPC ............. *F24F 11/56* (2018.01); *F24F 11/58* (2018.01); *F24F 11/63* (2018.01); *G05B 19/042* (2013.01);
(Continued)

(58) Field of Classification Search
CPC .. F24F 11/56; F24F 11/58; F24F 11/63; F24F 2110/10; F24F 2110/20; F24F 11/30; G05B 19/042; G05B 2219/2614; G05D 23/1905
See application file for complete search history.

(56) References Cited

U.S. PATENT DOCUMENTS

2004/0076153 A1 * 4/2004 Hallenbeck ........... H04L 12/282
                                                                370/252
2005/0270151 A1 * 12/2005 Winick .................. G08B 17/00
                                                                340/539.1
(Continued)

FOREIGN PATENT DOCUMENTS

WO    WO-2016126271 A1 * 8/2016 .............. F24F 11/30

*Primary Examiner* — Alicia M. Choi
(74) *Attorney, Agent, or Firm* — Boon Intellectual Property Law, PLLC; Brian S. Boon

(57) ABSTRACT

Systems and methods for intelligent operation and control of primitive infrared (IR) controlled devices and appliances that requires little or no modification of existing devices and appliances or their controllers. Systems and methods for converting conventional infrared (IR) remote controls of primitive infrared (IR) controlled devices and appliances to networked and smart remote controls are described which enable the upgraded smart remote control to act as a smart controller for ductless HVAC appliances, flat-screen televisions, media players such as DVD and Blu-ray disc players, and other primitive infrared (IR) controlled devices. The technology presented enables one or multiple users to control, monitor, and manage their primitive infrared (IR) controlled devices and appliances smartly using a custom smartphone application linked to the upgraded smart thermostat remote.

12 Claims, 13 Drawing Sheets

Smart Module - for converting an IR remote control to a smart thermostat for ductless air conditioners

(51) Int. Cl.
   *F24F 11/58*   (2018.01)
   *G05B 19/042*  (2006.01)
   *F24F 110/20*  (2018.01)
   *F24F 110/10*  (2018.01)

(52) U.S. Cl.
   CPC ....... *F24F 2110/10* (2018.01); *F24F 2110/20* (2018.01); *G05B 2219/2614* (2013.01)

(56) References Cited

U.S. PATENT DOCUMENTS

| | | | | |
|---|---|---|---|---|
| 2012/0067561 A1* | 3/2012 | Bergman | ................ | F24F 11/59 |
| | | | | 236/51 |
| 2014/0244048 A1* | 8/2014 | Ramachandran | ..... | H04W 4/029 |
| | | | | 700/278 |
| 2014/0358299 A1* | 12/2014 | Miura | ................ | G05B 13/024 |
| | | | | 700/282 |
| 2015/0051739 A1* | 2/2015 | Song | ................ | G05B 15/02 |
| | | | | 700/276 |
| 2015/0144706 A1* | 5/2015 | Robideau | ................ | F24F 11/30 |
| | | | | 236/94 |
| 2015/0365249 A1* | 12/2015 | Shetty | ................ | F24F 11/66 |
| | | | | 700/300 |
| 2016/0072638 A1* | 3/2016 | Amer | ................ | F24F 11/62 |
| | | | | 398/106 |
| 2016/0274611 A1* | 9/2016 | Amer | ................ | G05F 1/66 |
| 2017/0244574 A1* | 8/2017 | Moon | ................ | H04L 41/22 |
| 2017/0248338 A1* | 8/2017 | Ray | ................ | G05B 15/02 |
| 2017/0288401 A1* | 10/2017 | Hummon | ................ | G05B 15/02 |
| 2018/0147913 A1* | 5/2018 | Bergin | ................ | B60H 1/00657 |
| 2019/0141179 A1* | 5/2019 | Dushane | ................ | F24F 11/58 |
| 2019/0316799 A1* | 10/2019 | Bharatia | ................ | F24F 11/54 |
| 2019/0346170 A1* | 11/2019 | Benefield | ................ | G01N 1/2273 |
| 2020/0182501 A1* | 6/2020 | Malcolm | ................ | G05D 23/1917 |
| 2020/0400327 A1* | 12/2020 | Thumati | ................ | F24F 11/49 |
| 2021/0033298 A1* | 2/2021 | Klein | ................ | F24F 11/61 |
| 2021/0302043 A1* | 9/2021 | Dempsey | ................ | F24F 11/64 |
| 2022/0210884 A1* | 6/2022 | Campagna | ................ | H05B 47/165 |
| 2022/0329762 A1* | 10/2022 | Dattilo-Green | ................ | H04L 67/025 |

* cited by examiner

Fig. 8

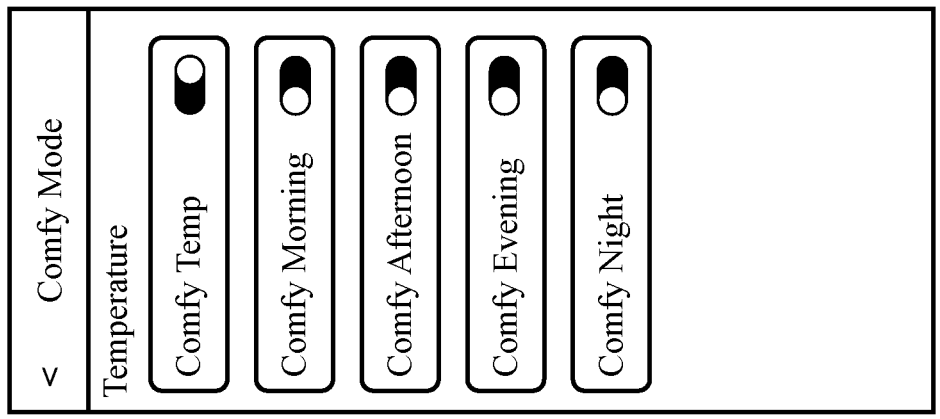
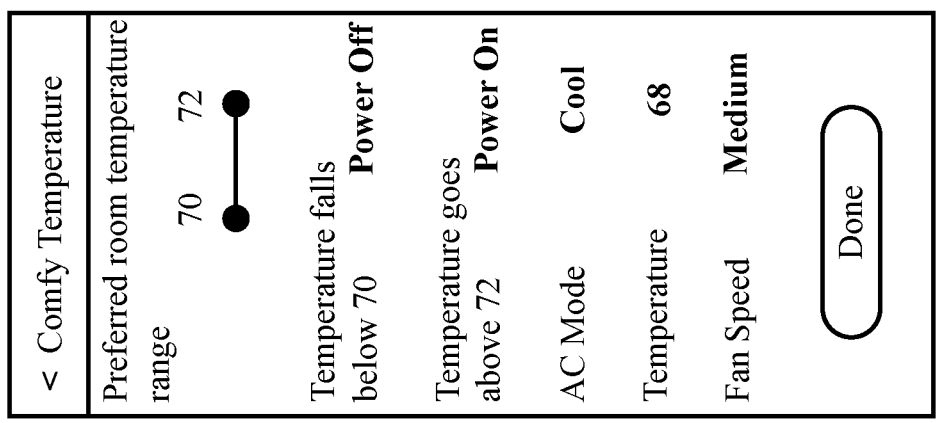
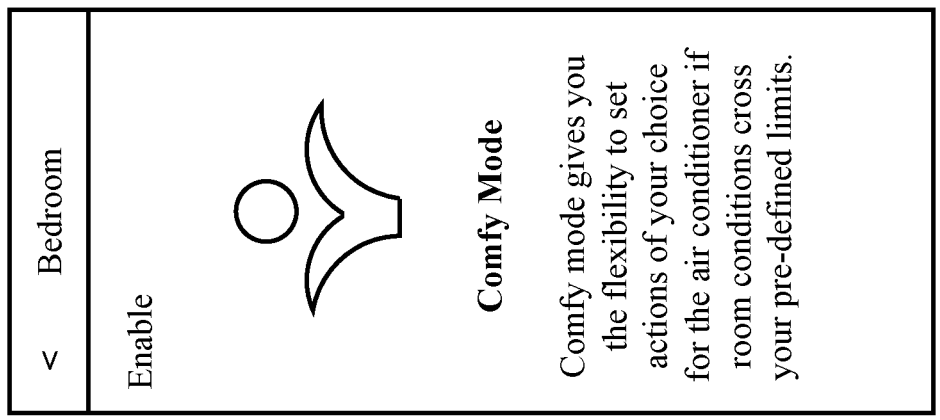
Fig. 9

SMART CONTROL MODULE FOR DUCTLESS HVAC UNITS

CROSS-REFERENCE TO RELATED APPLICATIONS

None.

BACKGROUND

Field of the Art

The disclosure relates to the field of computer control systems, and more particularly to the field of wireless control of ductless HVAC systems.

Discussion of the State of the Art

Consumers in today's world often have multiple household devices and appliances that are controlled via primitive infrared (IR) remote controllers. Three common examples of such devices include ductless heating, ventilation, and air conditioning (HVAC) appliances (mini split units, window units, and portable units), flat-screen televisions, and media players such as digital video disc (DVD) and Blu-ray players. These devices are typically installed or used at multiple locations in homes and offices, but are individually controlled by a conventional infrared (IR) remote control provided with each unit by the manufacturer. The IR remote controls relay user commands to the appliances for appropriate actions. The existing IR remote controls for these devices are very primitive, allowing only for immediate setting of simple controls such as, in the case of HVAC appliances, temperature, fan speed, heat/cool, etc. They are not capable of executing more complicated functions such as scheduled usage, smart triggers and thermostats, setting of temperature ranges, intelligent/predictive operation to optimize energy efficient usage, guiding the users about usage history of their air conditioners for energy efficient lifestyles, or similar smart functions.

Further, they have no means for coordinating with other units. Flat-screen televisions and media players cannot, for example, be instructed to display the same movie on all devices throughout the home. In the case of HVAC appliances, unlike ducted HVAC systems which heat and/or cool multiple rooms and for which heating and cooling zones can be established and controlled from a central location, ductless HVAC systems are installed in a single room and provide heating or cooling to that room only. When multiple ductless HVAC system are installed in different rooms, the user must manually change the settings for each unit in each room separately using the primitive controls of each unit's IR controller. No centralized coordination or control of multiple IR-controlled devices is available.

What is needed is a system and method for intelligent operation and control of primitive IR-controlled devices and appliances, and preferably a system and method which requires little or no modification of existing devices and appliances or their controllers.

SUMMARY

Accordingly, the inventor has conceived and reduced to practice, systems and methods for intelligent operation and control of primitive IR-controlled devices and appliances that requires little or no modification of existing devices and appliances or their controllers, but allows for intelligent operation any number of these devices either directly or remotely through a computing device. Systems and methods for converting conventional infrared (IR) remote controls of primitive IR-controlled devices and appliances to networked and smart remote controls are described which enable the upgraded smart remote control to act as a smart controller for ductless heating, ventilation, and air conditioning (HVAC) appliances (mini split units, window units, and portable units), flat-screen televisions, media players such as digital video disc (DVD) and Blu-ray players, and other primitive IR-controlled devices. The technology presented enables one or multiple users to control, monitor, and manage their primitive IR-controlled devices and appliances smartly using a custom smartphone application linked to the upgraded smart thermostat remote.

According to a preferred embodiment, a smart control module for operation and control of infrared-controllable devices is disclosed, the smart control module comprising a memory, a processor, an input port, a wireless communication device, a power source, and a first plurality of programming instructions stored in the memory which, when operating on the processor, causes the smart control module to: receive, at the input port, a control signal related to operation of a standard infrared remote controller for infrared-controllable devices; determine a first control setting associated with the control signal, the first control setting being associated with an infrared-controllable device operable by the standard infrared remote controller; establish a wireless connection to a wireless-capable device; and transmit operational information to the wireless-capable device using the wireless communication device, the operational information comprising the control setting and an smart control module identifier.

According to an aspect of an embodiment, the wireless-capable device is a mobile device operating an application configured to manage the operation of one or more infrared-controllable devices.

According to an aspect of an embodiment, the application operating on the mobile device wherein the application comprises a second plurality of programming instructions which, when operating on the mobile device, causes the mobile device to: receive the operational information; retrieve a list of infrared-controllable devices associated with smart control modules; identify an infrared-controllable device associated with the smart control module identifier; and update a status of the infrared-controllable device with the first control setting; and display the status of the infrared-controllable device on a screen of the mobile device.

According to an aspect of an embodiment, the application is further configured to: receive an input from a user of the mobile device, the input comprising a second control setting for the infrared-controllable device; and transmit the second control setting to the wireless communication device of the smart control module.

According to an aspect of an embodiment, the smart control module is integrated into the standard infrared remote controller; the power source is a battery within the standard infrared remote controller; the input port is connected to a first electronic component of the standard infrared remote controller such that the signal received at the input port is associated with the operation of a button on the standard infrared remote controller, smart control module further comprises an output port connected to a second electronic component of the standard infrared remote controller; and the smart control module is further configured to: receive the second control setting; send a change signal based on the second control setting via an output port to a second electronic component of the standard infrared remote controller, the change signal comprising instructions to change a setting of the infrared-controllable device in accordance with the second control setting.

According to an aspect of an embodiment, smart control module further comprises a temperature or humidity sensor, wherein: the second control setting comprises a temperature, range of temperatures, humidity, or range of humidities; and the smart control module is further configured to periodically send additional change signals to maintain the temperature or humidity sensor at or within the second control setting.

According to an aspect of an embodiment, the second control setting comprises schedule information, and wherein the smart control module is further configured to periodically send additional change signals according to the schedule information.

According to an aspect of an embodiment, the smart control module further comprises an exterior case, a means of attachment for attaching the case to the standard infrared remote controller, an infrared receiver, an output port, and a second infrared emitter; the smart control module is further configured be attached over a first infrared emitter of the infrared remote controller via the attachment means of the exterior case; the power source is a battery within the exterior case; the smart control module is configured to receive infrared signals from the first infrared emitter at the input port via the infrared receiver and output a copy of the signal from the second infrared emitter via the output port; and the smart control module is further configured to: receive the second control setting send a change signal based on the second control setting via the output port to the infrared emitter, the change signal comprising instructions to change a setting of the infrared-controllable device in accordance with the second control setting.

According to an aspect of an embodiment, the smart control module further comprising a temperature or humidity sensor, wherein: the second control setting comprises a temperature, range of temperatures, humidity, or range of humidities; and the smart control module is further configured to periodically send additional change signals to maintain the temperature or humidity sensor at or within the second control setting.

According to an aspect of an embodiment, the second control setting comprises schedule information, and wherein the smart control module is further configured to periodically send additional change signals according to the schedule information.

According to an aspect of an embodiment, the wireless-capable device is a wireless router, and the smart control module is configured to operable via the Internet through a cloud-based server accessible via a web browser.

According to an aspect of an embodiment, the infrared-controllable device is a ductless HVAC appliance, and the change signal comprises infrared control codes for the ductless HVAC appliance.

According to an aspect of an embodiment, the smart control module is configured to receive the infrared control codes from an application operating on a mobile device.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 8 is a set of screenshots of an application for a mobile device showing scheduling of operation of ductless HVAC appliances through smart HVAC control modules.

FIG. 9 is a set of screenshots of an application for a mobile device showing automated management of ductless HVAC appliances through smart HVAC control modules.

DETAILED DESCRIPTION

Figure 1:
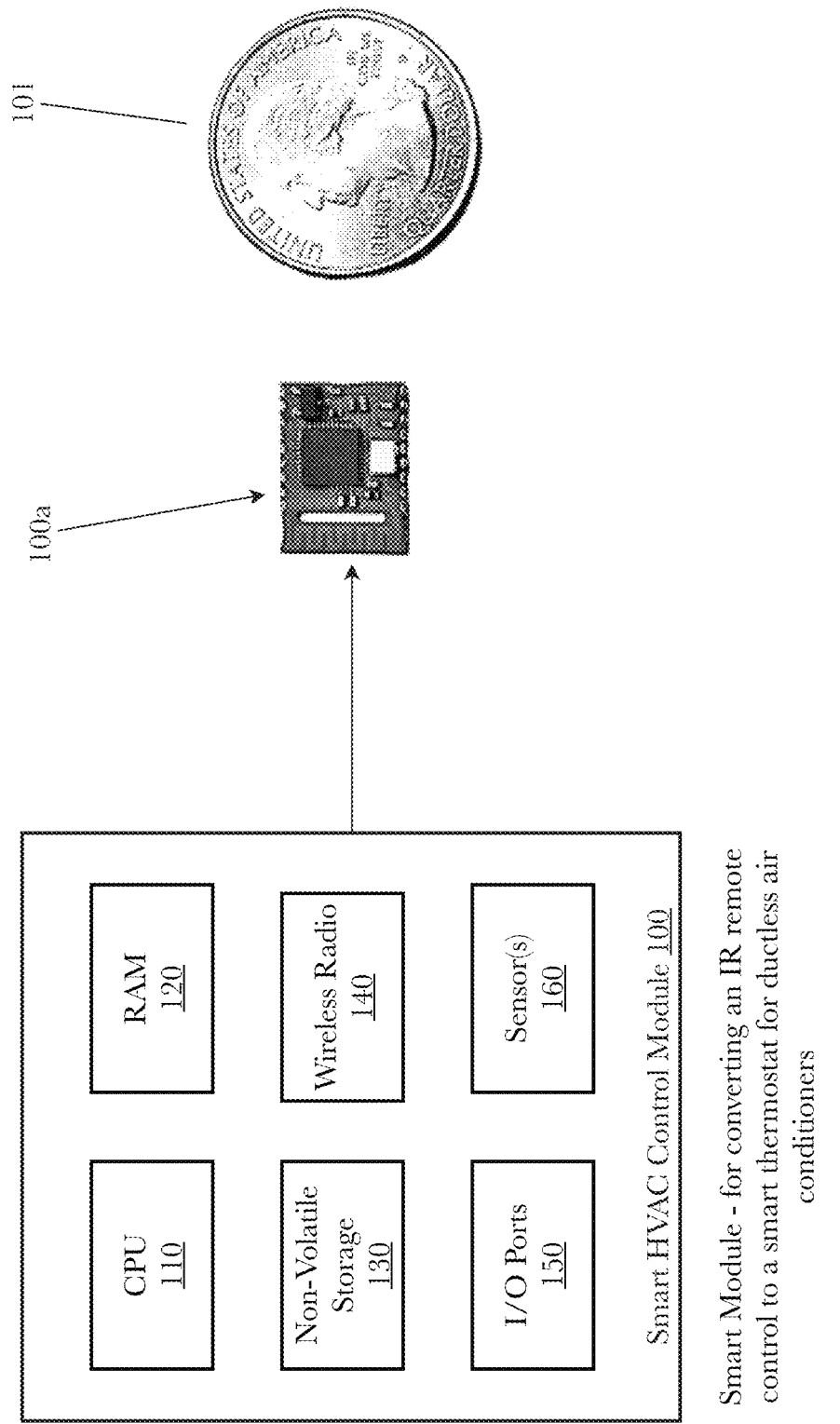
FIG. 1 is a block diagram illustrating a hardware architecture for a smart HVAC control module.

The inventor has conceived, and reduced to practice, systems and methods for intelligent operation and control of primitive IR-controlled devices and appliances that requires little or no modification of existing devices and appliances or their controllers, but allows for intelligent operation any number of these devices either directly or remotely through a computing device. Systems and methods for converting conventional infrared (IR) remote controls of primitive IR-controlled devices and appliances to networked and smart remote controls are described which enable the upgraded smart remote control to act as a smart controller for ductless HVAC appliances (mini split units, window heating and cooling units, and portable heating and cooling units), flat-screen televisions, media players such as DVD and Blu-ray disc players, some children's toys, other primitive IR-controlled devices. The technology presented enables one or multiple users to control, monitor, and manage their primitive IR-controlled devices and appliances smartly using a custom smartphone application linked to the upgraded smart thermostat remote.

While the examples herein discuss embodiments associated with HVAC appliances, the invention is not limited to HVAC appliances, and includes any device or appliance controlled by a primitive IR controller, some common and non-limiting examples of which are ductless heating, ventilation, and air conditioning (HVAC) appliances (mini split units, window units, and portable units), flat-screen televisions, media players such as digital video disc (DVD) and Blu-ray players, and children's toys.

In various embodiments, the technology includes a smart module that can be embedded into conventional IR remote controls of ductless HVAC appliances to convert the IR remote controls to smart remote controllers connected via a custom application for smartphone, mobile phone, or other computer, and optionally to a custom cloud platform which can provide additional functionality and remote operation via the Internet. Using the system, users can control HVAC appliances, generate analytics, schedule automatic operation, and perform smart learning operations.

In one embodiment, a clip-on smart module unit is attached to one or more primitive IR controllers. The smart module is configured to receive and pass through any IR controls received from operation of the IR controller to its associated HVAC unit, while simultaneously transmitting notification of the controls received to a mobile app via WiFi, Bluetooth, or another wireless communication protocol. The smart module is also configured to receive controls wirelessly from the mobile app, convert those controls into IR signals, and transmit those IR signals to a particular HVAC unit as if the IR controller for that HVAC unit had itself generated them. In this way, a plurality of ductless HVAC systems can be monitored and controlled remotely by a mobile device that acts as a centralized, intelligent control system for the HVAC units. In some embodiments, the system and method further comprising cloud-based functionality, such that a plurality of mobile computing devices (or other computing devices) can access and control any HVAC unit registered to a given account.

In another embodiment, universal IR controllers can be manufactured containing IR signal codes for the ductless HVAC systems of major manufacturers and/or configurable to be able to "learn" IR codes from the IR controller of a given ductless HVAC unit. The universal controller is manufactured with a built-in smart module containing the necessary networking features to interact with an app on a mobile computing device. The operation of the universal IR controller is otherwise similar to that of the clip-on smart module described above.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating a hardware architecture for a smart HVAC control module. The smart HVAC control module of this embodiment is a system constructed on a PCB board comprising a central processing unit (CPU) 110, random access memory (RAM) 120, non-volatile storage such as a flash storage (based on electrically erasable, programmable memory (EEPROM) technology) 130, a wireless communication device (e.g., supporting Bluetooth, WiFi, or other wireless communication protocols 140, input/output ports 150, and optionally sensors 160 such as infrared light sensors. An actual implementation 100a of a smart HVAC control module 100 is shown in relation to the size of a U.S. quarter 101. Its small size means that it can easily be integrated into existing IR remotes for HVAC systems or into an attachable (e.g., clip-on) device that can be attached to existing IR remotes without modification.

Software and other operational programming and functionality can be stored in the non-volatile storage 130, loaded into faster volatile memory such as RAM 120, and run on the CPU 110. Input/output ports 150 (which may be "pins" on integrated circuits (ICs) and microcontrollers) provide connections with other devices and/or systems (e.g., in the case of internal integration of the module 100 into an IR remote, and sensors 160 may be used to provide additional functionality. As one example, in the case of an attachable device, an IR sensor may receive an IR signal from the existing IR remote, and one of the output ports may be an IR transmitter that outputs an IR signal (which may simply be a pass-through of the sane IR signal) to the HVAC appliance. In this way, the IR signal from the IR remote can be intercepted, acted upon by the module, and re-transmitted to the HVAC appliance, such that the HVAC appliance operates as though the IR signal had been received directly from the IR remote.

Figure 2:
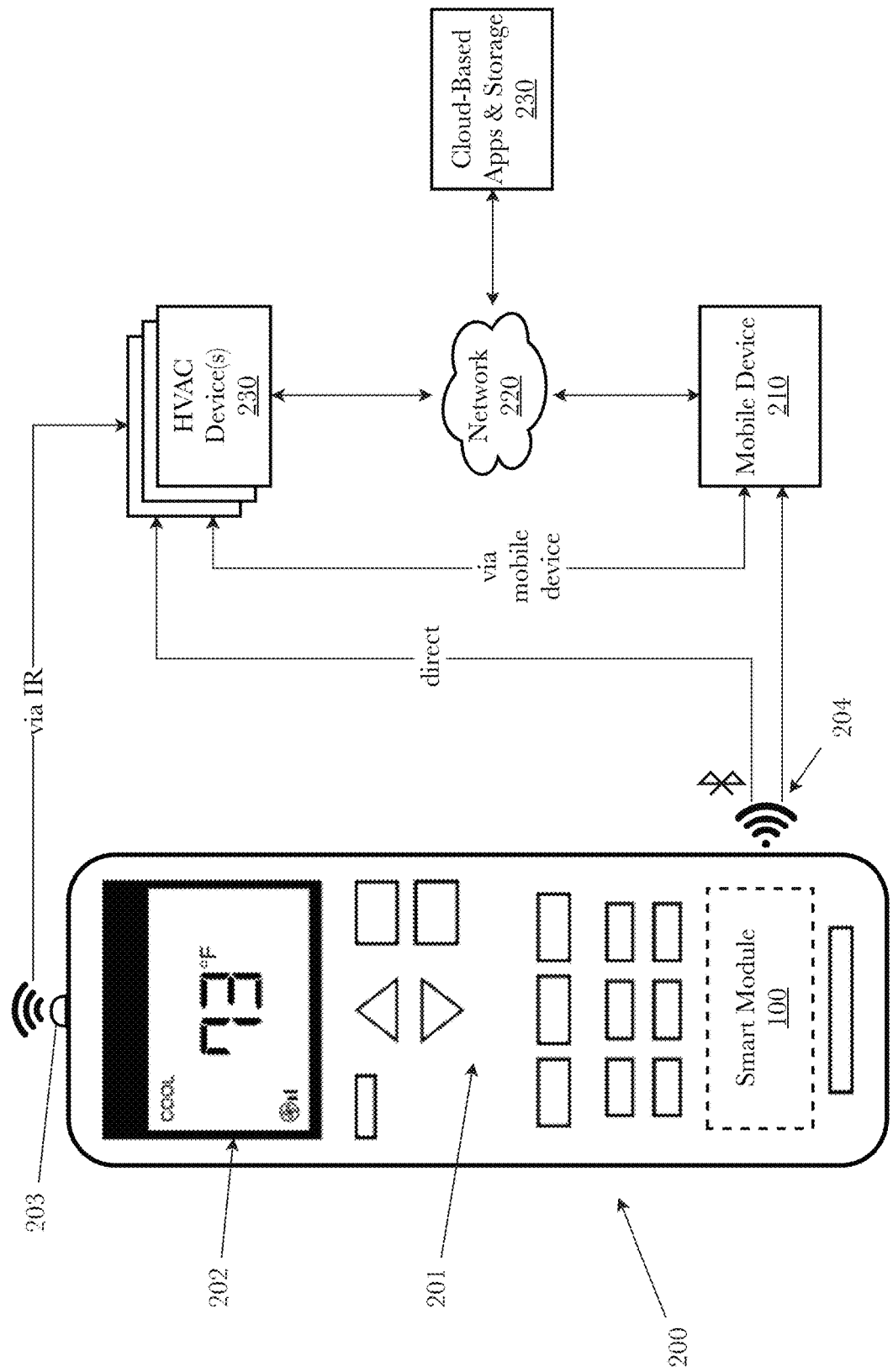
FIG. 2 is a block diagram illustrating an exemplary system architecture for a smart HVAC control system for ductless HVAC appliances.

FIG. 2 is a block diagram illustrating an exemplary system architecture for a smart HVAC control system for ductless HVAC appliances. In this embodiment, a smart HVAC control module 100 is directly integrated into an otherwise standard infrared (IR) remote controller 200 for ductless HVAC systems.

A standard IR remote controller 200 is a handheld device containing buttons 201 for activating various features of the HVAC appliance, a screen 202 which displays information about the HVAC appliance such as the current temperature, whether the device is in heating, cooling, or auto mode, the current fan speed, etc., and an infrared emitter 203, typically in the form of a light emitting diode (LED) capable of emitting infrared light. The reason infrared is used is that it is not visible to the human eye, so does not appear to project a beam of light on the wall or appliance (i.e., it is invisible to the user). Note that, in some models of IR remote controllers, the screen may be a touchscreen, and the buttons may be software buttons on the touchscreen. The term "button" herein refers to both variants. Here, the standard IR remote controller 200 has either been manufactured with, or modified to include, a smart module 100, the integrated smart module 100 being capable through its I/O ports of 150 either of receiving signals related to the operation of the remote controller's 200 buttons 201, or of receiving signals from the remote controller 200 directing the operation of the IR emitter 203, for the purposes of transmitting information to the mobile device 210. Further, the smart module of this embodiment is capable of directing the operation of the IR remote control 200 using its I/O ports 150 (e.g., upon receipt of instructions from the mobile device 210, the smart module 100 can direct the IR remote control 200 to change the operation of the HVAC appliance 230 via its IR emitter 203). The smart module of this embodiment is powered by the batteries of the standard IR remote controller 200.

As the IR remote control 200 is operated, the smart module 100 receives the one or more signals about the operation from the IR remote control 200 via its I/O ports 150. The smart module 100 transmits signals detailing the operation wirelessly 204 (e.g., via Bluetooth) to a mobile device 210 running an application configured as a centralized management application for one or more HVAC appliances 230. The wireless transmission 204 may any wireless transmission protocol (e.g., Bluetooth, WiFi, etc.) and may contain information about the operation and/or current state of the controller (e.g., an identifier for the smart module 100, what button was pushed on the controller 200, what the current temperature and mode settings are, etc.). The HVAC appliances 230 can receive signals in one of four ways: directly via the IR (i.e., primitive IR control), directly via the wireless transmission 204 from the smart module 100, via a wireless transmission from the mobile device, or via a wireless transmission from a router connected to a network 220. In the latter three cases, the HVAC appliances must be network-capable (i.e., contain a wireless device and other appropriate hardware, software, and/or firmware to receive wireless signals) from the smart module 100, the mobile phone 210, or a router connected to the network 220. However, even if the HVAC appliance(s) are not network-capable, the operation of, and current status of, the HVAC appliance(s) 230 is still received and tracked by the mobile device.

The mobile device 210 (which may be any network-connected computing device, but is assumed in this embodiment to be a smartphone, laptop computer, or tablet computer) acts as a central HVAC management system for any number of HVAC devices installed at any number of locations, provided that smart-module-enabled 100 IR remote control 200 is available for each HVAC appliance to be managed by the mobile device 210. While only one mobile device 210 is shown here, any number of mobile devices may be configured to operate the smart modules 100. While not shown here, in some configurations, the mobile device(s) may be connected to the smart modules 100 and/or other mobile device(s) 210 via a network (which may be a local network such as via a wireless router, a wide area network involving multiple routers, the Internet, etc.). As the mobile device 210 receives wireless transmissions 204 from each IR remote control 200, the application on the mobile device 100 tracks information about the status of the IR remote control and the status of its associated HVAC appliance 230 including, but not limited to, information such as from which smart module 100 the transmission was received, which HVAC appliance 230 is associated with that smart module 100, the current room temperature sensed by the IR remote control 200, the current temperature setting of the IR remote control 200, the current mode (heat, cool, auto, etc.) of the IR remote control 200, and the current fan speed setting. The application on the mobile device may be configured to display appropriate information to the user about the status of IR remote controls 200 and their associated HVAC appliances 230. Further, the application may be used to manage, control, and/or schedule the operation of HVAC appliances 230 via communication with the smart module 100 of their associated IR remote controls 200. For example, a user with HVAC appliances installed upstairs and downstairs in his home may set the downstairs HVAC appliance to maintain the temperature within a range of 20° C. to 25° C., and the upstairs HVAC appliance to maintain the temperature within a range of 23° C. to 27° C. The mobile device 210 will maintain either continuous or periodic communication with the smart modules 100 associated with the downstairs and upstairs HVAC appliances, directing each smart module 100 to instruct the IR remote control 200 into which it is integrated to change the operation of the HVAC appliance 230 with which the IR remote control 200 is associated via its IR emitter 203.

The centralized management of HVAC appliances 230 may be further enhanced by connecting mobile devices 210 and network-capable HVAC appliances 230 to cloud-based applications and storage 230 via the Internet. This allows remote management of HVAC appliances from any network-enabled computing device anywhere in the world via web browsers, as the management application and storage of information can be located on the cloud-based server 230 without having to be downloaded or installed on a local computer or mobile device.

Figure 3:
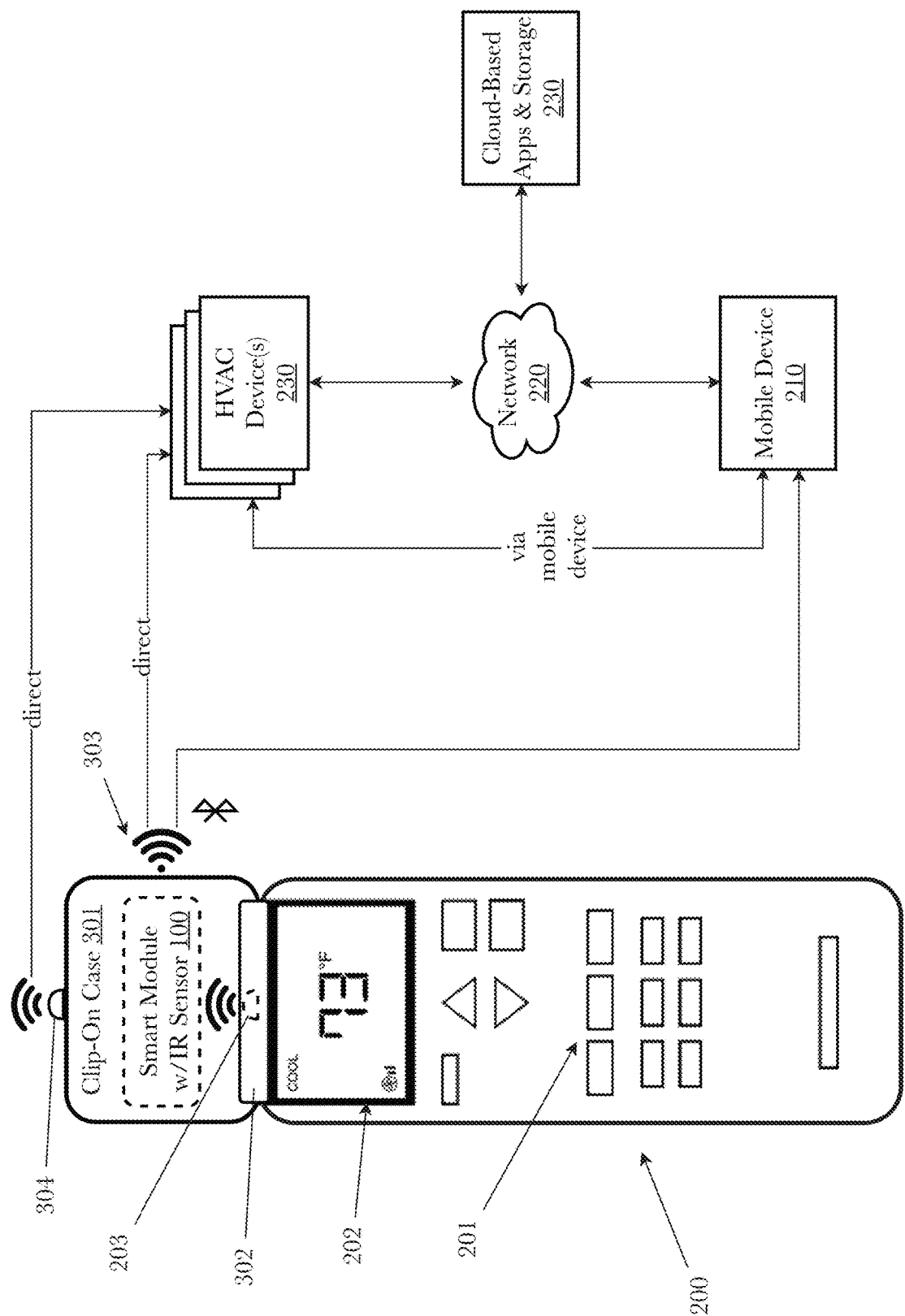
FIG. 3 is a block diagram illustrating an alternate system architecture for a smart HVAC control system for ductless HVAC appliances.

FIG. 3 is a block diagram illustrating an alternate system architecture for a smart HVAC control system for ductless HVAC appliances. In this embodiment, the smart module 100 is not integrated into the IR remote control 200, but is instead located inside a separate device (shown here as a clip-on case) 301 that can be attached to an unmodified IR remote control 200. The smart module of this embodiment is powered by the batteries inside the clip-on case 301.

The attachable separate device 301 is attached by a set of clips 302 or other convenient means of attachment (e.g., a sleeve, compression fitting, strap, tabs, screws, adhesives, hook-and-loop fastener such as Velcro®, etc.) over the IR emitter 203 of the IR remote control 200. In this way, an IR sensor on the smart module 100 can receive an IR signal from the IR emitter 203 intended to control the operation of an HVAC appliance 230. When the IR sensor receives the IR signal from the IR emitter 203, the smart module 100 decodes the IR signal to determine what operation instruction(s) the IR remote control 200 was sending to an HVAC appliance 230. The IR signal is typically in the form of coded pulses of infrared light at particular frequencies, which pulses and frequencies differ between manufacturers. The codes and frequencies and the operations the control can be either looked up or decoded using an IR sensor and an oscilloscope, and using these or other methods can be programmed into the smart module 100.

Upon receipt of the IR signal from the IR emitter, the smart module 100 decodes the signal and wirelessly transmits 303 information about the IR signal to a mobile device (or network-enabled HVAC appliance) for use in the mobile device's 210 HVAC management application. The smart module 100 may also be configured to simultaneously emit a copy of the IR signal via its own IR emitter 304, either as a direct pass through of, or regeneration of, the original IR signal from the IR emitter 203 of the IR remote controller 200.

In all other respects, the system of this embodiment operates similarly to the system of the embodiment described above in relation to FIG. 2.

Figure 4:
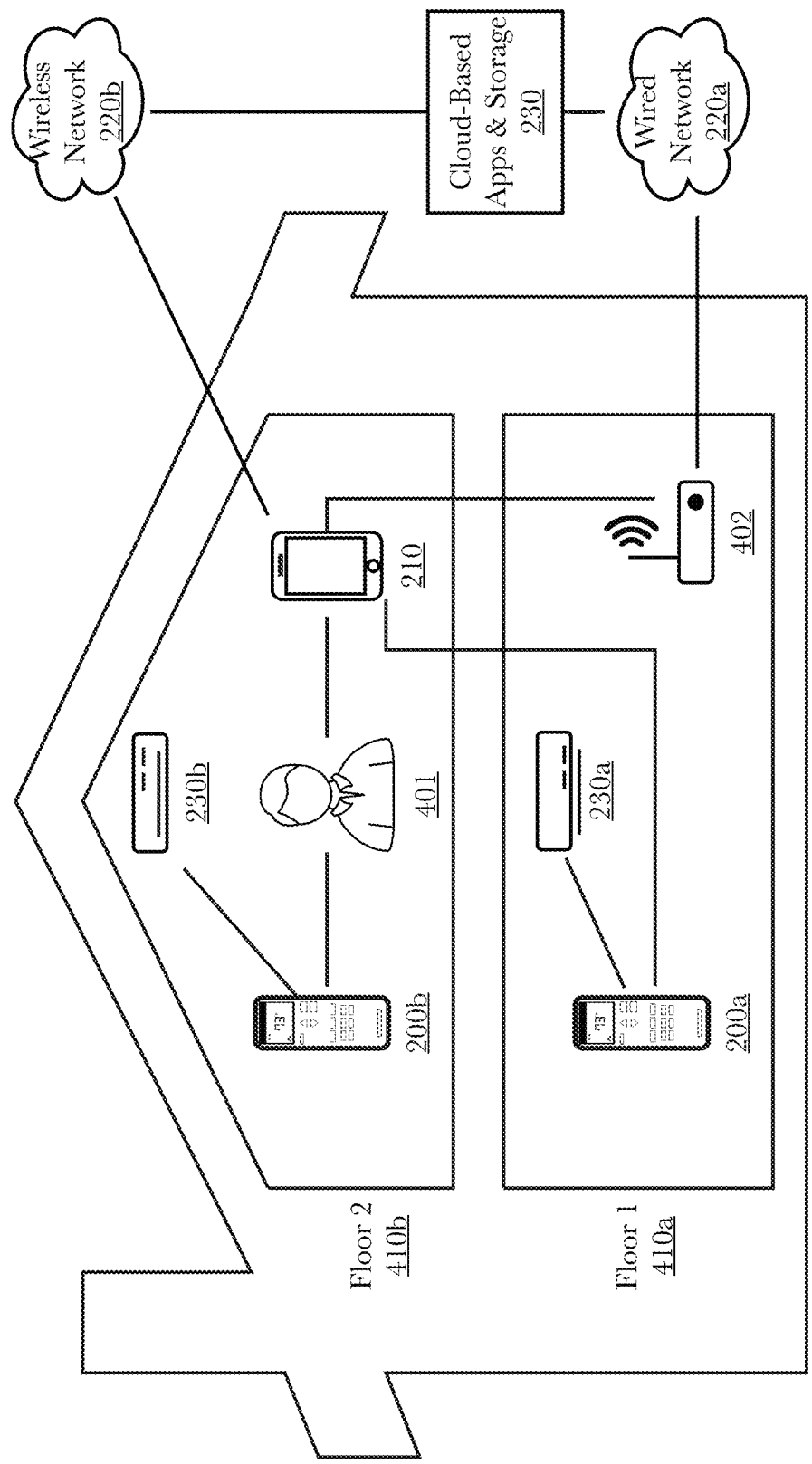
FIG. 4 is a block diagram illustrating an exemplary application of a smart HVAC control system for ductless HVAC appliances.

FIG. 4 is a block diagram illustrating an exemplary application of a smart HVAC control system for ductless HVAC appliances. Here, a homeowner 401 wishes to control the downstairs floor 1 410a and upstairs floor 2 410b of his home as different zones. Floor 1 410a is the downstairs zone containing a first ductless HVAC appliance 230a with its associated first IR remote control 200a. Floor 1 410a is also where the home's wireless router 420 is installed with a wired connection to a network 220a through a cable modem, a digital subscriber line (DSL) connection, or a fiber optic connection to the home. Floor 2 410b is the upstairs zone containing a second ductless HVAC appliance 230b with its associated second IR remote control 200b. In this example, the homeowner 401 is currently located on floor 2 410b and has his mobile device (in this case a smartphone) at hand. The homeowner may use the second IR remote control 200b to directly set the desired room temperature setting for the second HVAC appliance 230b, but cannot directly set the desired room temperature setting for the first HVAC appliance 230a, which is located downstairs. However, the homeowner can use his mobile device 210 to remotely set the desired room temperature setting for the second HVAC appliance 290b, whether the homeowner uses the IR remote controllers 200a,b or the mobile device 210 to change the settings of the HVAC appliances, the application on the mobile device receives wireless communications from smart modules 100 integrated into or attached to the IR remote controllers 200a,b, this keeping track of the status of all monitored HVAC appliances and allowing for centralized management thereof.

Depending on the configuration, the mobile device 210 may establish wireless connections directly with the IR remote controllers 200a,b, as shown in this diagram, or may establish wireless connections through the home's wireless router 402 to which the IR remote controllers 200a,b are connected (not shown in this diagram). In configurations where the HVAC appliances 230a,b are network-capable (e.g., where a smart HVAC control module 100 is installed in, or attached to, the HVAC appliance), the HVAC appliances may be controlled directly by the mobile device 210 or other computer through a network connection without having to route the controls through the IR remote controllers 200a,b. Further, the mobile device and/or smart modules 100 of the IR remote controllers 200a,b may be connected to a cloud-based management system 230 either via a wireless connection 220b such as a cellular data service or via a wireless router with a wired connection 220a to a network such as through a cable modem, a digital subscriber line (DSL) connection, or a fiber optic connection to the home. In configurations with cloud-based management system 230, the HVAC appliances may be controlled remotely from anywhere in the world using any computing device running a web browser and connected to the Internet.

Detailed Description of Exemplary Aspects

Figure 5:
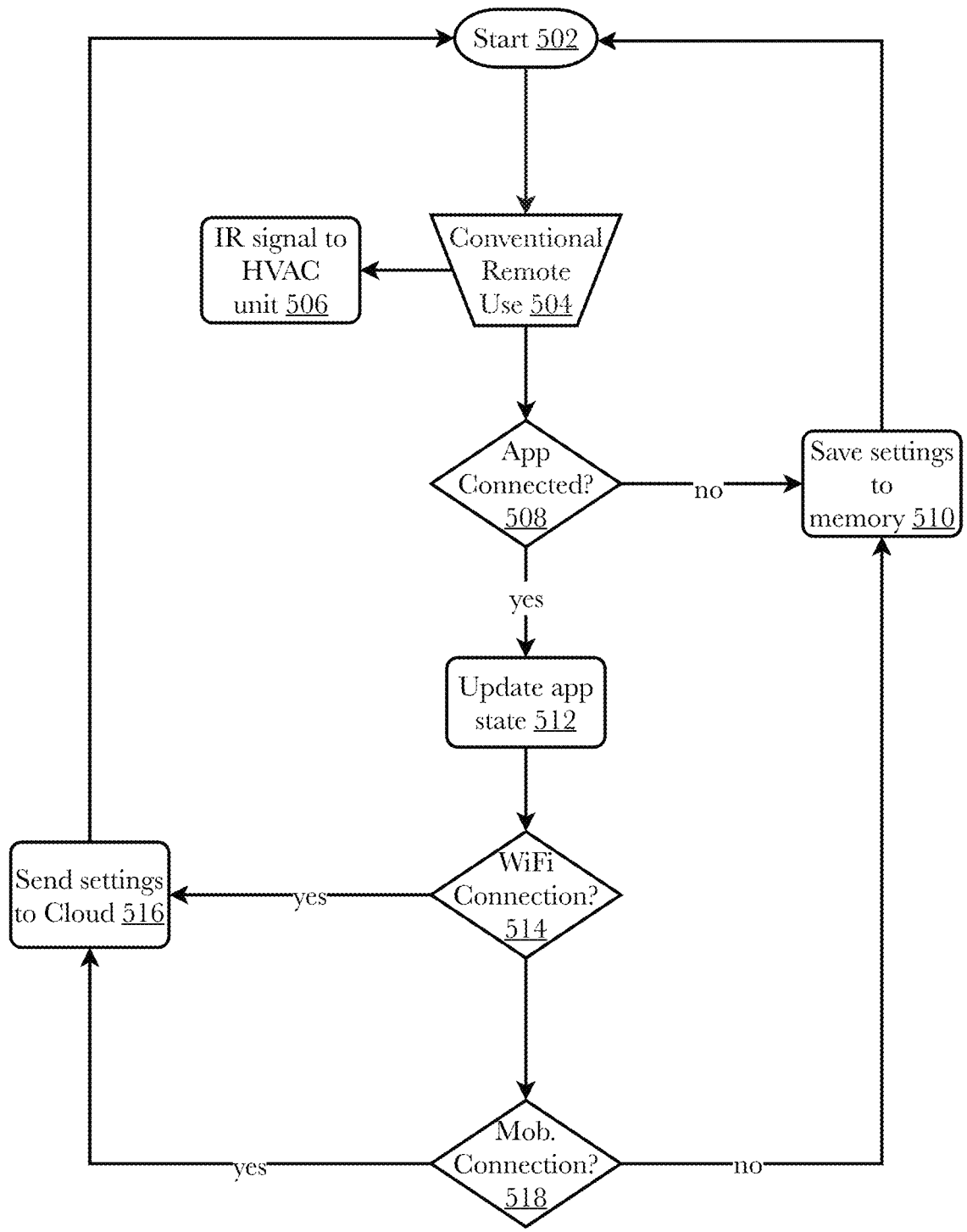
FIG. 5 is a flow diagram illustrating exemplary operation of a smart HVAC control system when a conventional IR remote is used to operate an HVAC appliance.

FIG. 5 is a flow diagram illustrating exemplary operation of a smart HVAC control system when a conventional IR remote is used to operate an HVAC appliance. At the start of the process 502 the HVAC appliance is ready to receive a control signal. When a user operates the conventional IR remote controller 504, the IR remote controller sends an IR signal 506 to the HVAC appliance to change its operation. The smart module of the IR remote controller checks to see whether it is connected to an application on a mobile device 508. If it is not so connected, the smart module saves the changed settings to it memory (either volatile or non-volatile), and the process returns to the start 502. If the smart module is connected to a mobile device, the smart module transmits information about the changed settings to the application of the mobile device 512. Depending on the configuration, the mobile device then checks to see whether it has a network connection to a cloud-based management system via a wireless router (typically via WiFi). If it has a network connection through a router, the mobile device sends the changed settings to the cloud-based management system for logging 516, and the process returns to the start 502. If the mobile device does not have a network connection 518, the mobile device checks to see if it has a connection to the cloud-based management server via a mobile (i.e., cellular) network. If so, it sends the changed settings to the cloud-based management system for logging 516. If not, the application of the mobile device saves the settings to the mobile device's memory 510, and the process returns to the start 502.

Figure 6:
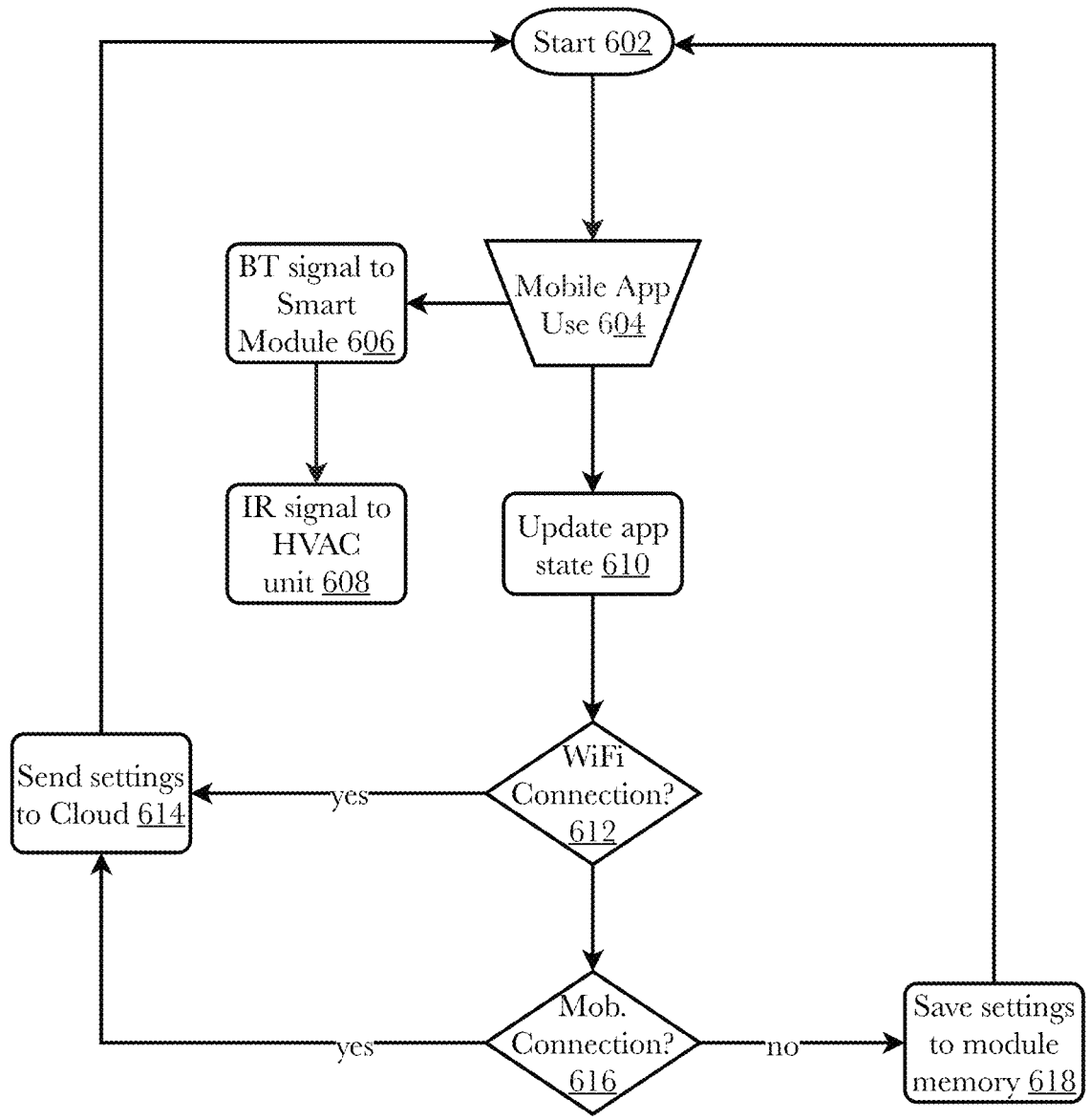
FIG. 6 is a flow diagram illustrating exemplary operation of a smart HVAC control system when an app on a mobile device is used to operate an HVAC appliance.

FIG. 6 is a flow diagram illustrating exemplary operation of a smart HVAC control system when an app on a mobile device is used to operate an HVAC appliance. At the start of the process 602 the HVAC appliance is ready to receive a control signal. When a user operates an application on a mobile device 604, the mobile device sends a wireless signal (e.g., via Bluetooth) 606 to the smart module which, in turn, sends an IR signal to the HVAC appliance to change its operation 608. The application on the mobile device updates its status to reflect the changes 610. The mobile device then checks to see whether it has a network connection to a cloud-based management system via a wireless router (typically via WiFi) 612. If it has a network connection through a router, the mobile device sends the changed settings to the cloud-based management system for logging 614, and the process returns to the start 602. If the mobile device does not have a network connection via a router, the mobile device checks to see if it has a connection to the cloud-based management server via a mobile (i.e., cellular) network 616. If so, it sends the changed settings to the cloud-based management system for logging 614. If not, the application of the mobile device saves the settings to the mobile device's memory 618, and the process returns to the start 602.

Figure 7:
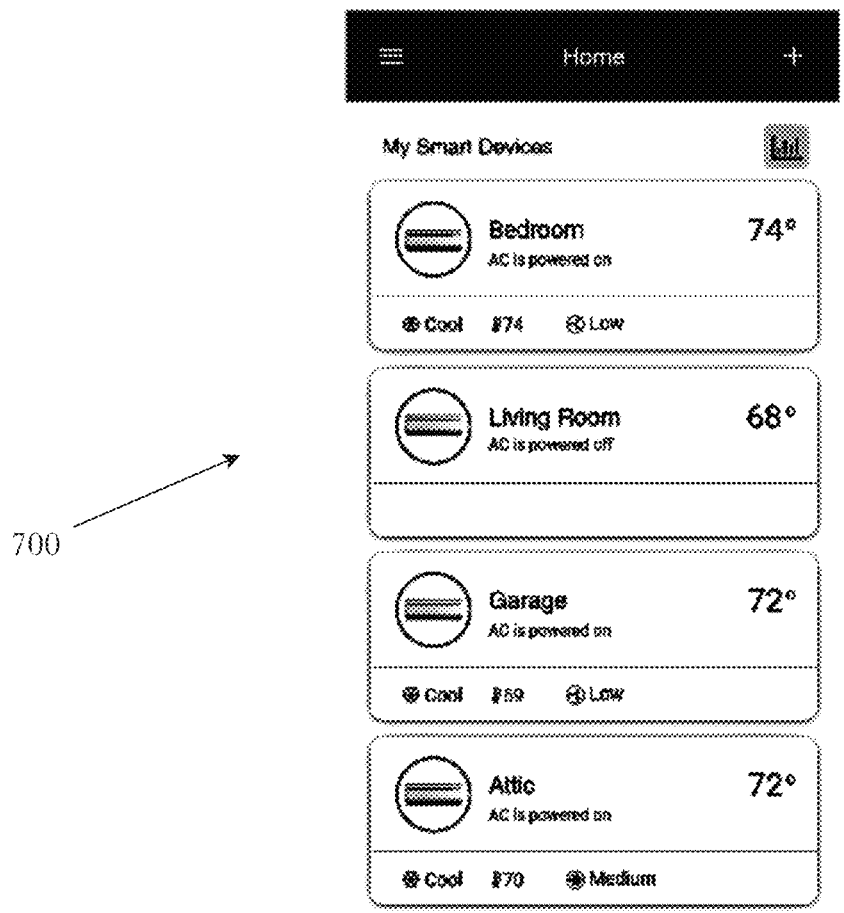
FIG. 7 is a screenshot of an application for a mobile device showing management of multiple ductless HVAC appliances through smart HVAC control modules.

FIG. 7 is a screenshot of an application for a mobile device showing management of multiple ductless HVAC appliances through smart HVAC control modules. The screenshot 700 shows four HVAC appliances in four different locations throughout a home, each with its individual settings shown. Selecting one of the HVAC appliances (e.g., by tapping the screen on the mobile device) opens up a screen allowing for changing of the settings of that HVAC appliance using the methods described herein. In this way, the mobile device (or a corresponding cloud-based management application) acts as a central management device for all connected HVAC appliances.

Figure 8:
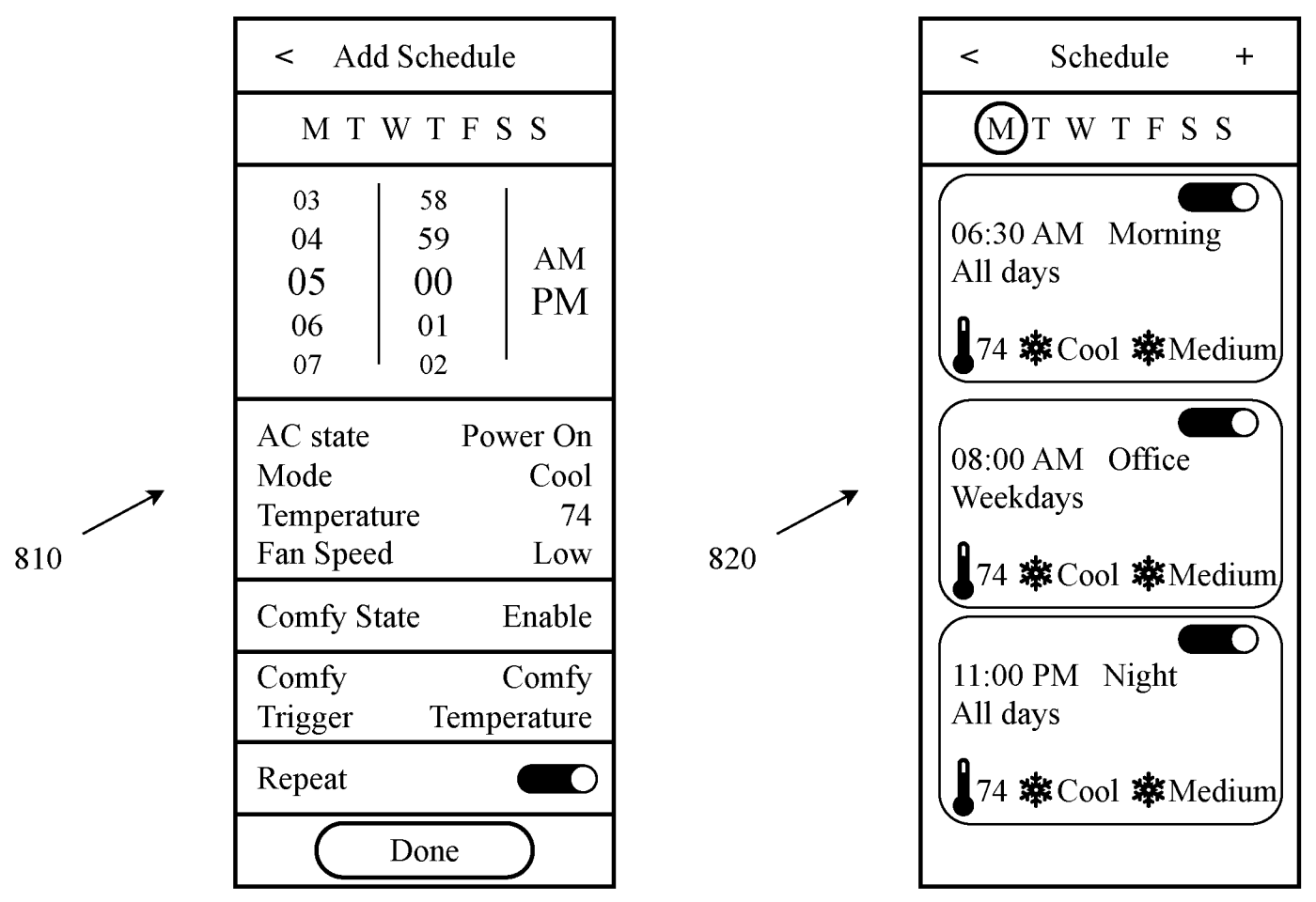

FIG. 8 is a set of screenshots of an application for a mobile device showing scheduling of operation of ductless HVAC appliances through smart HVAC control modules. The first screenshot 810 shows a scheduling interface for a connected HVAC appliance allowing for setting of days of the week, times of the day, states, modes, temperatures, fan speeds, and certain automated management functions with pre-defined or user-definable operations such as a "comfy state," and "comfy trigger," as will be described below. The second screenshot 820 shows a series of scheduling states that have been programmed using the interface, a morning schedule having a first group of settings, an office (daytime) schedule having a second group of settings, and a night schedule having a third group of settings.

Upon setting of the schedule via the application, the mobile device transmits the schedule information to the smart HVAC control module 100, which stores the information in its memory or non-volatile storage, and operates the HVAC appliance according to the schedule by sending signals to the standard IR remote controller or operating its own IR emitter by the means described above. For example, if the schedule stored by an attachable smart module 100 contains instructions to turn on the HVAC appliance at 1 pm with a temperature range of 20° C. to 25° C., the attachable smart module 100 will monitor the room temperature using an internal temperature sensor, and emit coded IR signals using its IR emitter to the HVAC appliance at appropriate times to turn the HVAC appliance on and off (or changes modes) to ensure that the room temperature remains within the range. For integrated smart modules 100, the process is the same, except that the smart module sends instructions via its output port to an electronic component of the standard IR remote controller, instructing the standard IR remote controller to operate the HVAC appliance at appropriate times to turn the HVAC appliance on and off (or changes modes) to ensure that the room temperature remains within the range.

FIG. 9 is a set of screenshots of an application for a mobile device showing automated management of ductless HVAC appliances through smart HVAC control modules. The first screenshot 910 shows an exemplary "comfy mode" setting which automated HVAC management according to certain user-defined preferences and pre-defined programming. The second screenshot 920 shows exemplary user-defined preferences that may be selected for the exemplary "comfy mode" which, when set, will cause the application to automatically manage one or more HVAC appliances through a smart HVAC control module 100 using pre-defined functions and logic. The third screenshot 930 shows selectable times of day at which the exemplary "comfy mode" can be toggled on or off, simplifying management of one or more HVAC appliances.

Upon setting of the automated management configurations via the application, the mobile device transmits the automated management configurations to the smart HVAC control module 100, which stores the information in its memory or non-volatile storage, and operates the HVAC appliance according to the schedule by sending signals to the standard IR remote controller or operating its own IR emitter by the means described above. For example, if the schedule stored by an attachable smart module 100 contains instructions to turn on the HVAC appliance at 1 pm with a temperature range of 20° C. to 25° C., the attachable smart module 100 will monitor the room temperature using an internal temperature sensor, and emit coded IR signals using its IR emitter to the HVAC appliance at appropriate times to turn the HVAC appliance on and off (or changes modes) to ensure that the room temperature remains within the range. For integrated smart modules 100, the process is the same, except that the smart module sends instructions via its output port to an electronic component of the standard IR remote controller, instructing the standard IR remote controller to operate the HVAC appliance at appropriate times to turn the HVAC appliance on and off (or changes modes) to ensure that the room temperature remains within the range.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
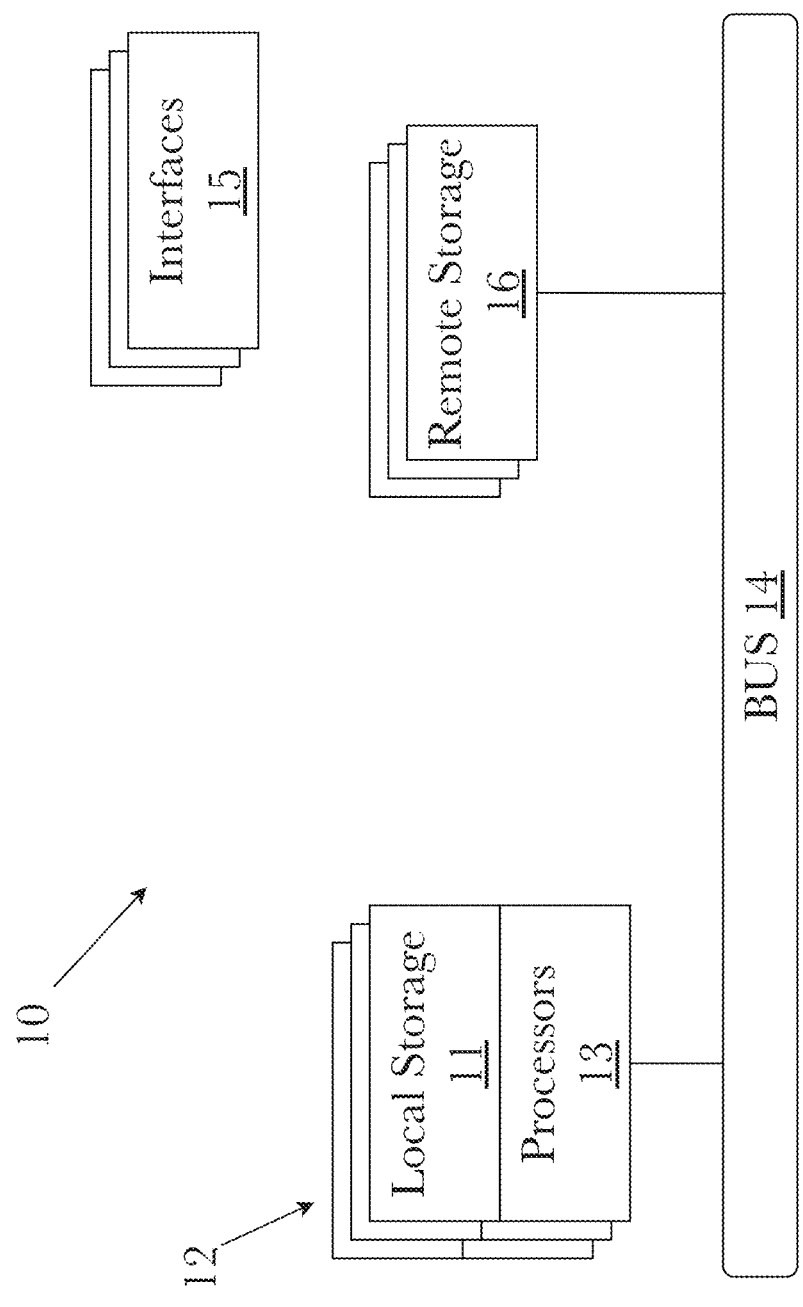
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like.

It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g. using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
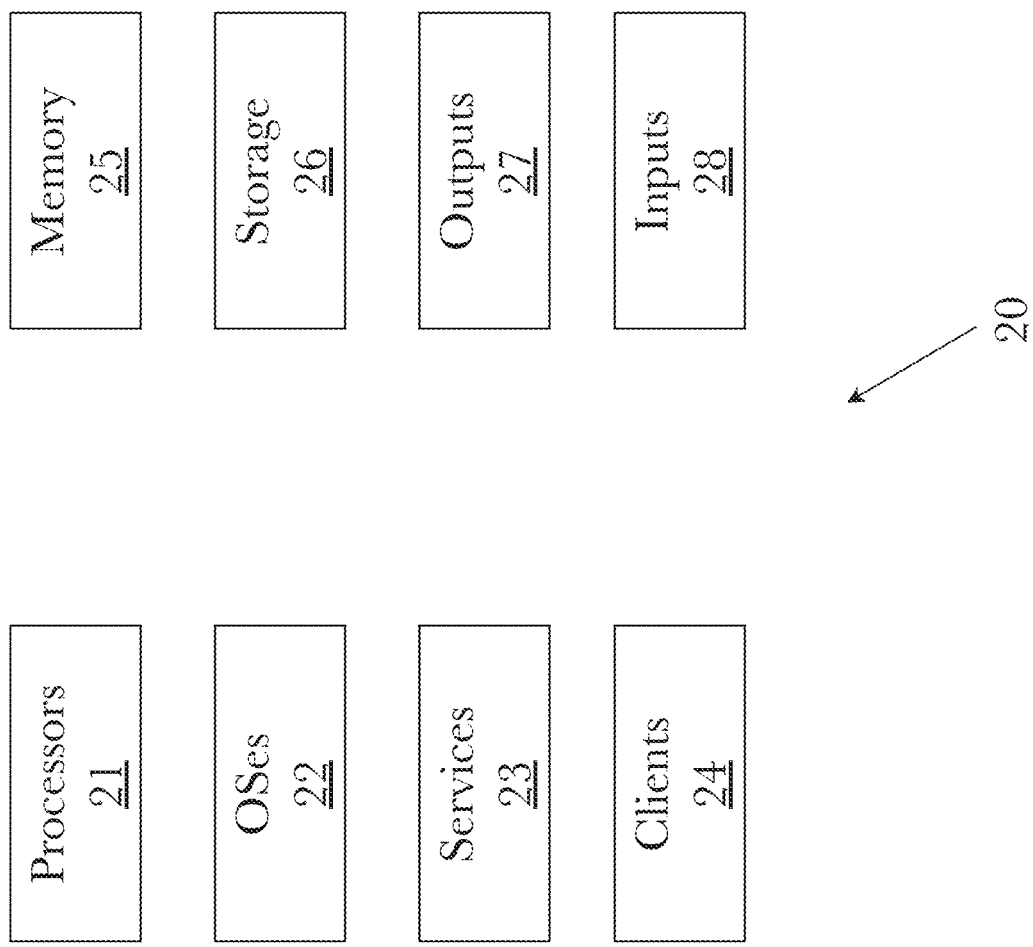
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOSm™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
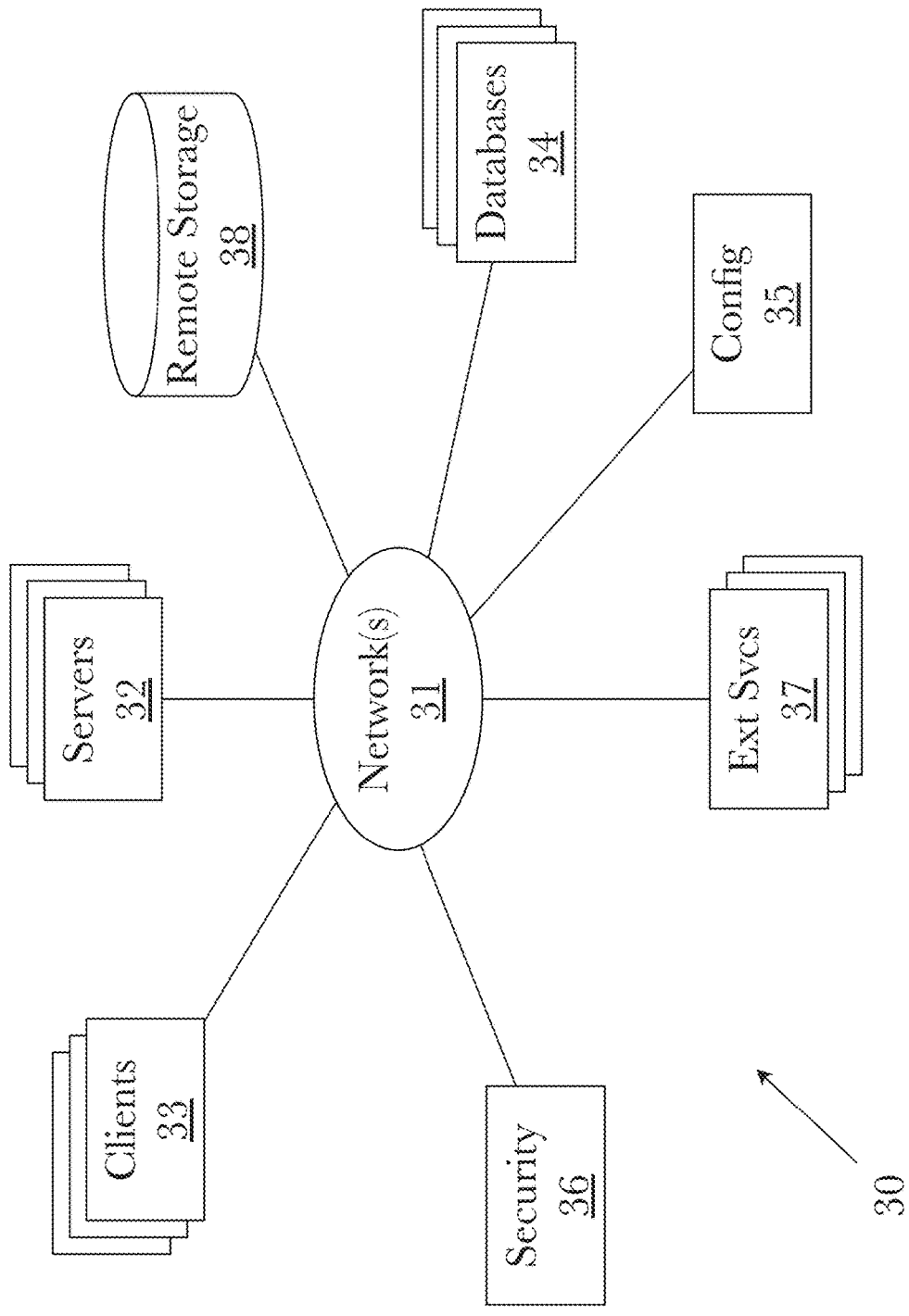
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
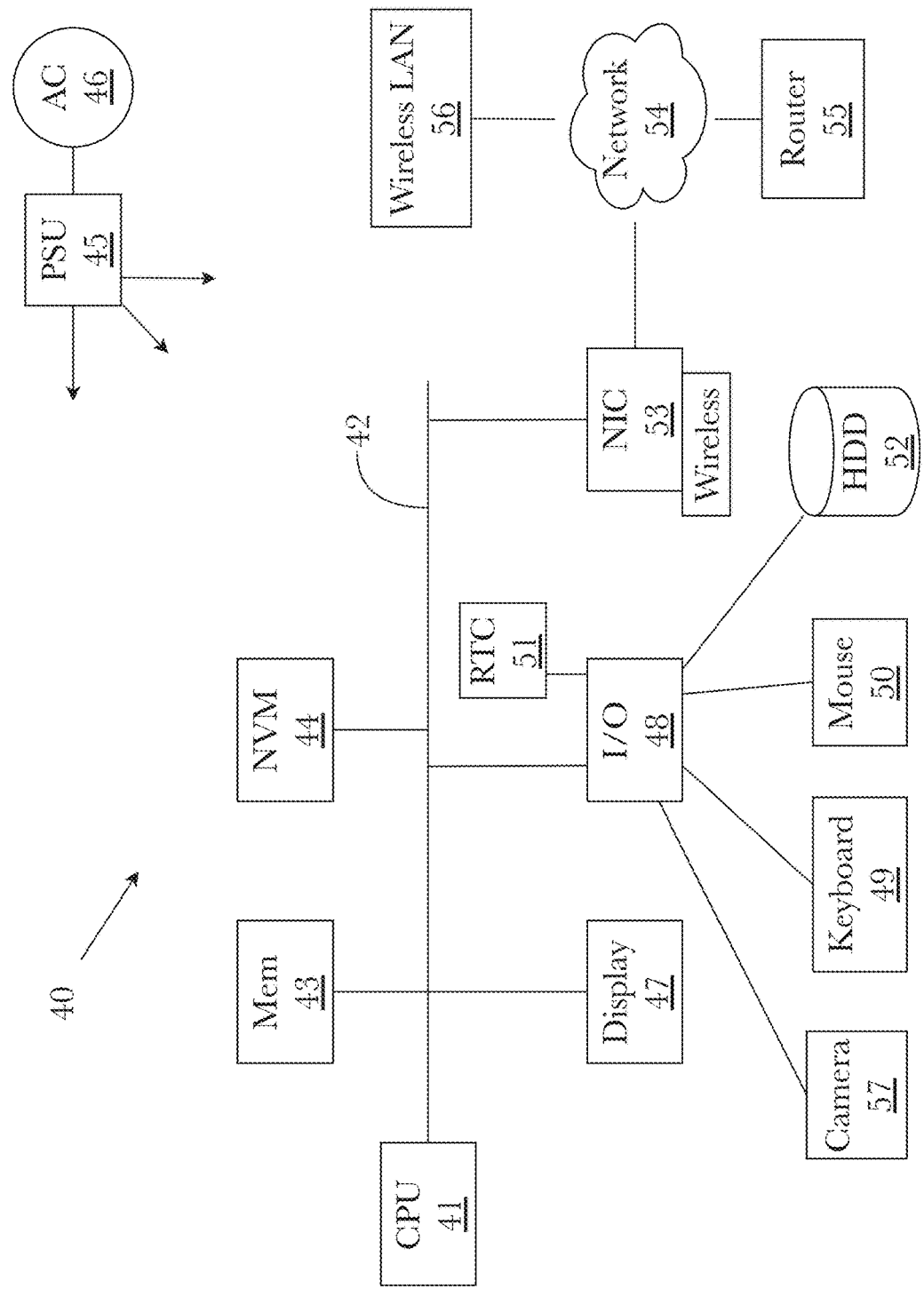
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A smart heating, air conditioning, and ventilation (HVAC) control system for coordinating control of groups of ductless HVAC appliances, comprising:
   a mobile phone executing an application configured as a centralized management application for a plurality of ductless HVAC devices;
   a plurality of attachable smart control modules, each smart control module attached to one of a plurality of conventional infrared remote controllers each configured to control a particular ductless HVAC appliance, and each smart control module comprising a memory, a processor, a wireless communication device, an exterior case, a means of attachment for attaching the case to an infrared remote controller, a battery, an infrared receiver, a first infrared emitter, and a first plurality of programming instructions stored in the memory, wherein, for each smart control module:
   the smart control module is powered by the battery;
   the smart control module is configured to be attachable to the conventional infrared remote controller for a ductless HVAC appliance using the means of attachment in such a way that the infrared receiver is capable of receiving infrared signals from a second infrared emitter of the infrared remote controller;
   the first infrared emitter is configured to emit infrared signals to a location outside of the exterior case;
   the first plurality of programming instructions, when operating on the processor, causes the smart control module to:
   establish a Wi-Fi connection to the mobile phone using the wireless communication device;
   when an infrared signal is received at the infrared receiver from the second infrared emitter, the infrared signal comprising a first control setting for the first ductless HVAC appliance:
   emit a copy of the infrared signal from the infrared emitter; and transmit operational information to the mobile phone, the operational information comprising the first control setting and a smart control module identifier;
   when the mobile phone transmits the operational information via the Wi-Fi connection:
   receive the operational information;
   convert the first control setting into a first infrared signal for operation of a first HVAC appliance; and
   output the first infrared signal to the output port for emission by the infrared emitter;
   wherein when the infrared signal is received at the infrared receiver from the second infrared emitter, the operational information is transmitted to the mobile phone which transmits it to a second infrared remote controller of the plurality of conventional infrared remote controllers to synchronize the operation of the first ductless HVAC appliance and a second ductless HVAC appliance associated with the first and second conventional infrared remote controllers.

2. The system of claim 1, wherein the smart control module is further configured to:
   receive a second control setting from the mobile phone; and
   send a change signal based on the second control setting to the first infrared emitter, the change signal comprising instructions to change a setting of the second ductless HVAC appliance in accordance with the second control setting.

3. The system of claim 2, wherein the mobile phone further transmits the operational information to a wireless router, and the second control setting is transmitted to the wireless router from a cloud-based server operating a second application configured to manage the operation of the ductless HVAC appliances.

4. The system of claim 3, further comprising the second application operating on the cloud-based server wherein the application comprises a second plurality of programming instructions which, when operating on the cloud-based server, causes the cloud-based server to:
  receive the operational information;
  retrieve a list of the ductless HVAC appliances each of which is controllable by, and associated with, one or more smart control modules, the one or more smart control modules comprising the smart control module;
  identify from the list a third ductless HVAC appliance of the list of the ductless HVAC appliances associated with the smart control module;
  update a status of the third ductless HVAC appliance to reflect the first control setting; and
  display the status of the third ductless HVAC appliance on a screen of a computer connected to the cloud-based server.

5. The system of claim 4, wherein the computer is connected to the cloud-based server via a web browser.

6. The system of claim 4, wherein the second application is further configured to:
  receive an input from a user of the computer, the input comprising the second control setting for the third ductless HVAC appliance; and
  transmit the second control setting to the wireless communication device of the smart control module via the wireless router.

7. The system of claim 6, further comprising a temperature or humidity sensor, wherein:
  the second control setting comprises a temperature, range of temperatures, humidity, or range of humidities; and
  the smart control module is further configured to periodically send additional infrared signals to the first infrared emitter to maintain the temperature or humidity sensor at or within the second control setting.

8. The system of claim 6, wherein the second control setting comprises schedule information, and wherein the smart control module is further configured to periodically send additional infrared signals to the output port to operate the first, second, and third ductless HVAC appliances according to the schedule information.

9. The system of claim 1, further comprising the application operating on the mobile device wherein the application comprises a second plurality of programming instructions which, when operating on the mobile phone, causes the mobile phone to:
  receive the operational information;
  retrieve a list of the ductless HVAC appliances and identifiers of smart control modules with which ductless HVAC appliances are associated;
  identify from the list a third ductless HVAC appliance associated with the smart control module identifier;
  update a status of the third ductless HVAC appliance to reflect the first control setting; and
  display the status of the third ductless HVAC appliance on a screen of the mobile device.

10. The system of claim 9, wherein the application is further configured to:
  receive an input from a user of the mobile device, the input comprising a second control setting for the third ductless HVAC appliance; and
  transmit the second control setting to the wireless communication device of the smart control module.

11. The system of claim 10, further comprising a temperature or humidity sensor, wherein:
  the second control setting comprises a temperature, range of temperatures, humidity, or range of humidities; and
  the smart control module is further configured to periodically send additional infrared signals to the first infrared emitter to maintain the temperature or humidity sensor at or within the second control setting.

12. The system of claim 10, wherein the second control setting comprises schedule information, and wherein the smart control module is further configured to periodically send additional change signals to the first infrared emitter to operate the first, second, and third ductless HVAC appliances according to the schedule information.

* * * * *